United States Patent Office 3,377,399
Patented Apr. 9, 1968

3,377,399
EXO AND ENDO 7-VINYL-BICYCLO
(3.2.0)-HEPTENE-2
Guido Sartori and Vittorio Turba, Milan, Italy, assignors to Montecatini Edison S.p.A., Milan, Italy, a corporation of Italy
No Drawing. Filed May 17, 1966, Ser. No. 550,604
Claims priority, application Italy, May 18, 1965, 11,116/65
2 Claims. (Cl. 260—666)

ABSTRACT OF THE DISCLOSURE

According to the present invention the isomers 7-vinyl-bicyclo[3,20]-heptene-2 and bicyclo[4,2,1] - nona 3,7-diene are synthesized by photochemical dimerization of cyclopentadiene and butadiene, respectively, in the presence of a sensitizer.

The process of this invention also allows the obtaining of bicyclo-[4,3,0]-nona-3,7-diene (4,7,8,9 tetrahydroindene), and 5-vinyl-bicyclo[2,2,1]-heptene-2 (5-vinyl-norbornene-2).

The present invention relates to new hydrocarbon compounds and to their synthesis.

Prior art

The photochemical dimerization of butadiene [G. S. Hammond, N. J. Turro, A. Fisher, J. Am. Chem. Soc. 83, 4674 (1961); G. S. Hammond, N. J. Turro, R. S. H. Liu, J. Org. Chem. 28, 3297 (1963)] and of cyclopentadiene [N. J. Turo, G. S. Hammond, J. Am. Chem. Soc. 84, 2841 (1962); G. S. Hammond and co-workers, J. Org. Chem. 28, 3297 (1963)] are already known in the literature.

The present invention

Applicants have now surprisingly found that subjecting a mixture of butadiene and cyclopentadiene to irradiation results in the formation of mixed dimers, as well as the formation of the homodimers of the two reactants.

The reaction of photochemical dimerization can be carried out either in a reactor kept under nitrogen at atmospheric pressure, or in a sealed vial. In the latter case, before sealing the vial, it is advisable to degas the solution to be irradiated. If the reaction is carried out in a reactor kept at atmospheric pressure, it is preferable to maintain the mixture subjected to irradiation under slight agitation by introduction of a nitrogen stream at the bottom of the reactor.

The temperature at which the irradiation is generally carried out varies between −25 and +5° C. Higher temperatures are not advisable since an increase in the thermal dimerization rate of cyclopentadiene corresponds to an increase of the temperature, resulting in the formation of cyclopentadiene homodimer (dicyclopentadiene). Temperatures below −25° C. are seldom used for economical reasons.

The molar ratio of cyclopentadiene to butadiene can vary within wide limits. Good yields of mixed dimerization products are obtained with ratios between 1:1 and 1:1.5.

Various carbonyl compounds can be used as sensitizing substances. Among the more commonly used are acetophenone, benzophenone, anthraquinone, p,p′-tetramethylaminobenzophenone, 2-acetonaphthone, 2-naphthaldehyde, 1-acetonaphthone, 1-naphtaldehyde and benzil. The amount of the sensitizer used varies within wide limits. Good results are obtained with amounts between 5 and 20% by weight of the mixture of the monomers to be irradiated.

One or more quartz mercury vapour lamps of the type of medium or high pressure, optionally provided with suitable filters, are used as the source of the ultraviolet radiations. The number of lamps to be employed depends on the power of each lamp and on the total power desired. The duration of the irradiation varies within wide limits and depends on the conversion percentage desired, and on the ratio of furnished power to amount of monomers to be irradiated. Under normal operation conditions times between 20 and 200 hours, preferably between 60 and 180 hours, may be used.

The final reaction mixture is subjected to distillation under reduced pressure, under the vacuum of a water pump in order to separate first the unreacted monomers, and then the dimerization products, from the sensitizer.

The following mixed dimerization products are found in the distillate:

(1) 5-vinyl-bicyclo[2,2,1]-heptene-2 (I), recognized by comparison with a pure sample.

(2) Bicyclo[4,3,0]-nona-3,7-diene (II) (4,7,8,9-tetrahydroindene), recognized by comparison with a pure sample.

(3) Two new products (III) and (IV).

The product (III) has a boiling point of 57° C. at 36 mm. Hg, and a refraction index $n_D^{20}$ of 1.4814.

The product (IV) has a boiling point of 40° C. at 16 mm. Hg, and a refraction index $n_D^{20}$ of 1.4840.

Analysis of the carbon-hydrogen content and of the infrared spectrum are carried out on the chromatographically pure products.

The analysis of the percentage of carbon and hydrogen content for product (III) gives the following results:
Theoretical for $C_9H_{12}$: C, 89.94%; H, 10.06%. Found: C, 89.96%; H, 10.11%.

The infrared spectrum of the product (III) gives the following characteristic bands:

| | Cm.$^{-1}$ |
|---|---|
| Stretching C—H of the vinyl | 3042 |
| Stretching C=C of the vinyl | 1635 |
| Deformation outside the plane of the C—H of the vinyl | 992 |
| Deformation outside of the plane $CH_2$ of the vinyl | 908 |
| Stretching C—H adjacent to the double bond in a ring of the cyclopentene type | 3078 |
| Stretching C=C in a ring of the cyclopentene type | 1605 |
| Deformation "cis" of the double bond, split bond at | 730 and 708 |

The analysis of the carbon-hydrogen content for the product (IV) gives the following results:
Theoretical for $C_9H_{12}$: C, 89.94%; H, 10.06%. Found: C, 89.87%; H, 10.10%.

The infrared spectrum of the product (IV) gives the following characteristic bands:

| | Cm.$^{-1}$ |
|---|---|
| Stretching C—H of the vinyl | 3042 |
| Stretching C=C of the vinyl | 1633 |
| Deformation outside the plane of the C—H of the vinyl | 992 |
| Deformation outside the plane of $CH_2$ of the vinyl | 905 |
| Stretching C—H adjacent to the double bond in a ring of the cyclopentene type | 3075 |
| Deformation from "cis" of the double bond | 735 |

On the basis of these results, it is possible to state that the compounds (III) and (IV) are isomers having the structure of vinyl-bicyclo[3,2,0]-heptene-2.

It appears that compound (III) has the exo structure, substitution of the vinyl group on the side chain, at carbon atom No. 7, while compound (IV) has an endo structure, with substitution of the vinyl group at carbon atom No. 7.

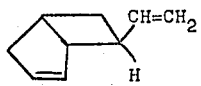
(III)

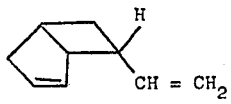
(IV)

When heated at temperatures higher than 85° C., the compound (IV) undergoes an easy rearrangement, giving a compound (V) having a boiling point of 52° C. at 16 mm. Hg and a refraction index $n_D^{20}$=1.5092.

The analysis of the infrared spectrum of the compound (V) reveals unsaturations in ring are present as results from the band at 3045 cm.$^{-1}$ (zone of the stretchings C—H adjacent to a double bond) and from the bands between 1600 and 1650 cm.$^{-1}$ (zone of the stretchings C=C).

The analysis of the spectrum of nuclear magnetic resonance confirms that the product (V) has the structure of bicyclo[4,2,1]-nona-3,7-diene.

(V)
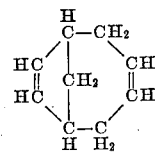

The new dienes obtained according to the present invention can be used as intermediates in the preparation of oxygenated derivatives, such as polycarboxylic acids and the corresponding anhydrides. Furthermore they can be hydrogenated partially or totally and can add halogen atoms. Besides they can be homopolymerized.

The invention will be better illustrated by the following examples, which are given to illustrate, but not to limit the invention.

Example 1

185 g. (2.8 mols) of cyclopentadiene, 158 g. (2.92 mols) of butadiene and 41 g. of acetophenone are introduced into a Pyrex reactor of the immersion type, having a volume of 550 cc., kept under a nitrogen atmosphere. The mixture is irradiated at −20° C. for 170 hours by means of 3 high pressure, Phillips HPK 125 watt mercury vapour lamps.

The reaction product is separated from unreacted butadiene by degassing the mixture at 20–25° C. under a vacuum of 500 mm. Hg and from cyclopentadiene by distilling it at 25–27° C. under a vacuum of 450–480 mm. Hg. Then successively, the dimerization products are separated from the acetophenone by a second distillation at the vacuum of a water pump. The distillate (240 g. conversion based on the monomers charged 70% by weight), when analyzed by gas-chromatography, reveals the following composition:

| Compound: | Percentages by weight |
|---|---|
| 5-vinyl-norbornene-2 | 25 |
| Compound III | 9 |
| Compound IV | 30 |
| Tetrahydroindene | 3 | the balance consisting of trans-1,2-divinylcyclobutane, cis-1,2-divinylcyclobutane, 4-vinyl - cyclohexene - 1 and homodimers of cyclopentadiene.

By rectification of this mixture in a Todd fractionation assembly under reduced pressure, 5-vinyl-norbornene-2, compound IV and the tetrahydroindene are obtained in the pure state. Additionally, a mixture of compound III and compound IV is obtained.

Example 2

30 cc. of the mixture of compounds (III) and (IV) are heated to 130° C. under a nitrogen atmosphere for 4 hours.

When analysed by gas-chromatography, the final reaction mixture is found to contain the compound (III) and bicyclo[4,2,1]-nona-3,7-diene.

Rectification under reduced pressure in a Todd column results in the separation of the two products in the pure state: the boiling points of the two compounds (III) and (V) are 57° C./36 mm. Hg and 52° C./16 mm. Hg respectively.

As will be apparent, various changes in details may be made in the practice of this invention without departing from the spirit thereof. It is intended, therefore, to include in the scope of the appended claims, all such modifications in details as will be obvious to those skilled in the art from the description and working examples given herein.

What is claimed is:
1. A new compound, endo-7-vinyl-bicyclo[3,2,0]-heptene-2 characterized by the following structure:

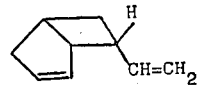

2. A new compound, exo-7-vinyl-bicyclo[3,2,0]-heptene-2 characterized by the following structure:

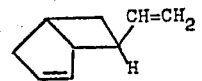

References Cited

UNITED STATES PATENTS 3,265,749   8/1966   Cannell _____ 260—666

DELBERT E. GANTZ, *Primary Examiner.*

V. O'KEEFE, *Assistant Examiner.*

UNITED STATES PATENT OFFICE

CERTIFICATE OF CORRECTION

Patent No. 3,377,399                              April 9, 1968

Guido Sartori et al.

It is certified that error appears in the above identified patent and that said Letters Patent are hereby corrected as shown below:

Column 2, line 50, "Deformation "cis" of the double bond, split bond" should read -- Deformation "cis" of the double bond, split band --.

Signed and sealed this 9th day of September 1969.

(SEAL)
Attest:

Edward M. Fletcher, Jr.                    WILLIAM E. SCHUYLER, JR.
Attesting Officer                                Commissioner of Patents